J. STORY.
Attaching Metal Collars to Glass Utensils.
No. 229,063.  Patented June 22, 1880.
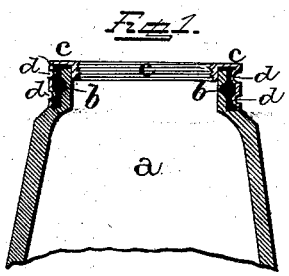
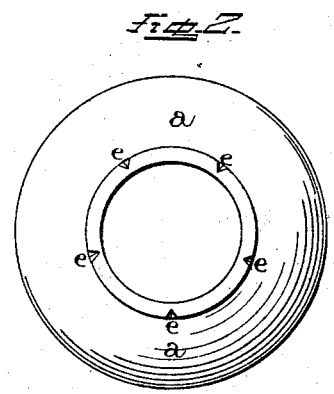
Witnesses  
W. W. Mortimer  
Chas. H. Isham
Inventor  
Jno. Story  
per  
F. A. Lehmann,  
Atty

UNITED STATES PATENT OFFICE.

JOHN STORY, OF BALDWIN TOWNSHIP, ALLEGHENY COUNTY, PA.

ATTACHING METAL COLLARS TO GLASS UTENSILS.

SPECIFICATION forming part of Letters Patent No. 229,063, dated June 22, 1880.

Application filed February 17, 1880.

*To all whom it may concern:*

Be it known that I, JOHN STORY, of Baldwin township, in the county of Allegheny and State of Pennsylvania, have invented certain new and useful Improvements in the Manner of Attaching Metal Collars to Glass Utensils; and I do hereby declare the following to be a full, clear, and exact description of the invention, such as will enable others skilled in the art to which it pertains to make and use it, reference being had to the accompanying drawings, which form part of this specification.

My invention relates to an improved method of fastening collars to glass articles; and it consists in blowing a groove in the glass at the point where a collar is to be attached, and vertical grooves which extend from the end of the neck into the horizontal groove, and then attaching the collar to the glass article, by means of a soft-metal bush, while the glass is hot enough to melt the metal and cause it to run in the groove and catch behind the bead in the collar, as will be more fully described hereinafter.

Figure 1 is a vertical section of my invention, and Fig. 2 is a plan view of a glass article with the collar removed.

*a* represents a glass article of any desired shape or size, and which, in the process of being blown, has the groove or grooves *b* made in it at the point where the collar *c* is to be attached. This collar is of the usual construction, and has one or more indentations or beads made around its inside, which beads *d* serve to catch in and under the metal bush, and thus prevent the collar from being pulled off.

In the edge of the glass *a* are made a number of notches, *e*, which run down into the groove *b*, and serve to allow the melted metal to run freely into the groove on all sides, and especially when the cap fits tightly over the glass.

While the glass is hot a quantity of lead or other metal that is easily melted is placed either in the groove *b*, around the neck, or in the inside of the collar, and then the neck of the hot glass is thrust inside of the collar. The metal is preferably cut in fine shreds, so that it will quickly melt, and when it does melt it runs in the groove and fills the inside of the collar, as shown. As this metal fills the groove and catches over and around the beads on the inside of the collar, it binds the collar and glass so securely together that the collar can only be removed by breaking the glass. Melted metal can also be used, which is to be poured into the collar.

The heat causes the collar to expand, and thereby increase the space between it and the glass, which space is to be occupied by the fused metal. When cooling, the collar, being of a harder material, having expanded more, also contracts more than the soft metal in contact with it, and consequently compresses the metal firmly around the glass and into the groove or grooves in its surface. At the same time the soft metal contracts while cooling more than the glass, and hence shrinks closely around it and holds on firmly.

The same preparation for connecting two parts of a glass or metallic article together is made on both parts, the collars being provided with male and female screws, so as to screw together.

This method of attaching two parts of a glass article together is equally adapted for securing collars to lamp-bowls. Where plaster-of-paris is used, should it become saturated with oil the plaster will no longer hold the collar on. By the use of soft metal, which is melted, as described, this objection is overcome.

Having thus described my invention, I claim—

The combination of a glass article having one or more grooves in its sides, and small notches or grooves extending from the end of the article into the grooves, with a metallic collar provided with internal beads, and a soft metallic packing applied between the article and the collar, so as to fill the grooves and notches and catch over the top of the beads, substantially as described.

In testimony that I claim the foregoing I have hereunto set my hand this 10th day of January, 1880.

JOHN STORY.

Witnesses:
T. F. LEHMANN,
CLARENCE BURLEIGH.